C. B. TRESCOTT.
PROCESS OF CURING MEAT.
APPLICATION FILED NOV. 5, 1917.

1,271,962.

Patented July 9, 1918.

Witnesses:
M Sullivan
Irwin C. Bowman

Inventor
Charles B. Trescott,
By Dyrenforth Lee Chritton Wiles
Atty's

UNITED STATES PATENT OFFICE.

CHARLES B. TRESCOTT, OF CHICAGO, ILLINOIS.

PROCESS OF CURING MEAT.

1,271,962.  Specification of Letters Patent.  Patented July 9, 1918.

Application filed November 5, 1917. Serial No. 200,295.

*To all whom it may concern:*

Be it known that I, CHARLES B. TRESCOTT, a citizen of the United States, residing at Chicago, in the county of Cook and State of Illinois, have invented a new and useful Improvement in Processes of Curing Meat, of which the following is a specification.

My present invention is in the nature of an improvement on the process set forth in my Patent No. 1,134,299, dated April 6, 1915, of curing meat by first pickling it in brine to impregnate only a portion of its thickness with salt and continuing the curing action of the salt by disseminating it throughout the remainder of the thickness while impregnating the meat with carbonic acid gas. The primary object attained by this patented procedure is that of effecting a mild and uniform cure by enabling the comparatively strong charge of salt in the partial thickness of the meat to become modified by dissemination throughout the entire thickness thereof.

The present process involves this same principle, but it is materially simplified, by wholly dispensing with the use of carbonic-acid gas and supplanting it by practices which attain the same result in a superior manner, particularly in curing certain meats, and more especially bacon in slabs, though my improved process may be advantageously employed for the mild curing of corned beef and different other meats.

Having devised my improvement more especially for the mild and uniform curing with salt of bacon, as aforesaid, and to avoid prolixity in explaining it, the following description is confined to the treatment of bacon in slabs, with reference to the accompanying drawing, in which—

Figure 1:
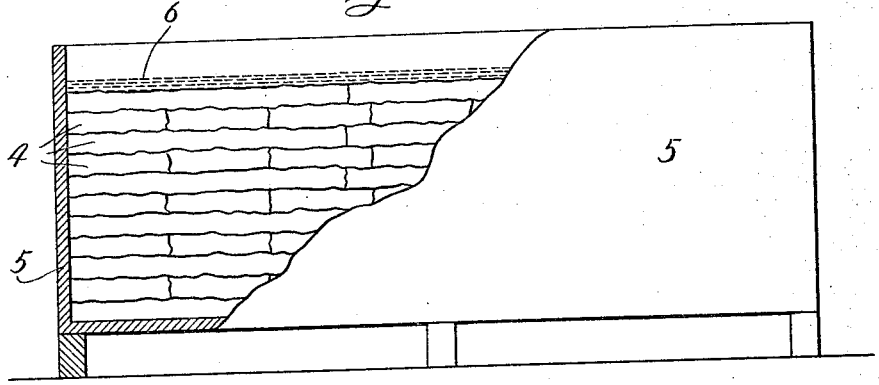
Figure 2:
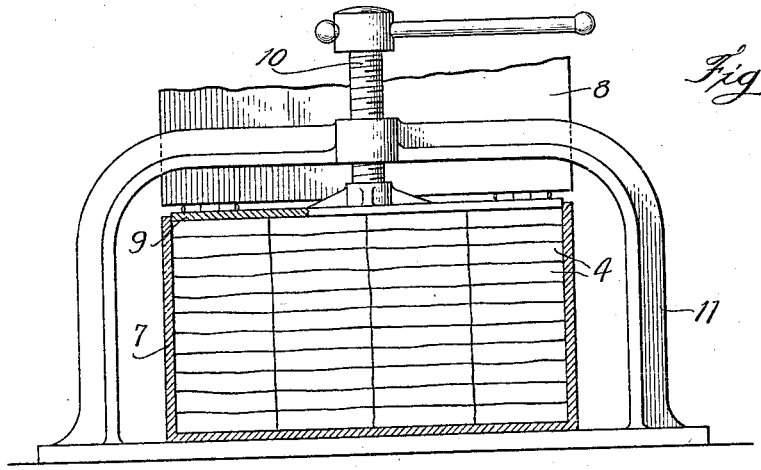
Figure 3:
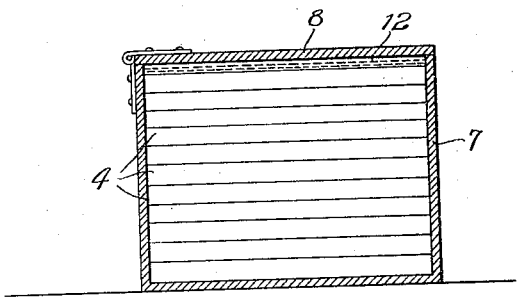

Figure 1 is a broken view in side elevation of a container shown as a box or vat, in which slabs of bacon are piled and undergoing pickling; Fig. 2 is a broken view showing, in longitudinal section, the rectangular curing box into which the bacon is transferred from the pickling vat and in which it is undergoing pressure, and Fig. 3 is a cross-sectional view of the curing box with its contents as they appear in undergoing the salt-disseminating curing after the pressure has been removed and the hinged box-lid has been lowered.

Slabs or sides 4 of bacon, to be treated, and which should be of substantially uniform dimensions, are piled flatwise and loosely, but by preference, in an orderly manner and with the slabs in each layer extending at right-angles to those in the next layer, in a box or vat 5, shown in Fig. 1 to be supported in raised position. This box, which is water-tight and is best constructed of wood, may be of any desired shape, though the rectangular form illustrated is preferred, since it enables the orderly laying in it of the slabs. The brine or "pickle," the liquid-level of which is indicated at 6, may be of any desired strength and should be stronger or weaker according to the thickness of the meat. Thus, for thin slabs, the brine may be of 45 to 50 degrees of gravity showing on a salometer, and for heavier slabs it may be 80 to 85 degrees. The slabs are left in the pickle until they have absorbed the predetermined amount of salt, when the salt will have penetrated to a depth of about one-fourth to one-third of the thickness of the meat. Thereupon the partially pickled slabs are removed from the vat 5 and transferred, for self-curing, into a rectangular box 7, preferably provided with a hinged lid 8. In this box the slabs are piled in an orderly manner in layers filling the horizontal dimensions of the box, preferably with the pieces in each layer extending parallel with those in the next layer.

As each layer is formed the meat is pressed by tamping, as with a maul, to cause it to fit snugly against the walls of the box and conform to the shape of the latter; and when the box is thus filled to the desired height, a high degree of pressure is uniformly applied, but only necessarily for about an hour, to the body of meat, as through the medium of a follower-plate 9 on the screw 10 of a screw-press 11, in which the box may be placed for the purpose.

Subjecting the meat to pressure in the rectangular curing-box has the incidental advantage of forming it into a compact body having straight sides, thereby preventing ragged or irregular edges on the pieces, which would have to be trimmed off with resultant waste. A very important purpose of the pressure, however, is to prevent pockets in different parts of the pile, which would afford lodgment for accumulations of brine shed by the meat and enable salt from the brine in such pockets to permeate the meat in spots throughout the pile and render portions of the affected slabs excessively salty, thus defeating my primary purpose of effecting a uniformly mild cure of each piece of the meat treated. When the pressure is relieved, by raising the follower 9, the brine shed from and squeezed out of the meat forms thereover a comparatively thin body 12 of brine of sufficient depth to provide an effective liquid seal against access to the meat of contaminating air. By providing this seal the use of carbonic acid gas, according to my aforesaid patent, may be entirely dispensed with and the expense thereof and that of the installation and maintenance of quite elaborate equipment required for its use thus avoided. However, any other suitable form of air-excluding seal may be provided over the meat in the curing box and is intended to be included within my invention.

After freeing the box from the press, the lid 8 should be closed to enable the box to be handled without spilling brine out of it, as for placing it in a pile of such boxes in which the curing is progressing by dissemination through each piece of the meat of the salt with which the pickle has only partially impregnated it. The desired uniformity of diffusion of the salt through all of the slabs in a curing box for producing the desired mildness and uniformity of cure is enhanced by the pressure, since it brings the slabs into close surface contact with each other, so that if there should be any excess of salt in slabs thus contacting with others that are less salty, the latter will take up from the former sufficient salt to equalize the distribution.

The time required for the curing under the osmotic action of the salt on the pickled slabs varies with the thicknes of the meat. To thus pickle and cure a side of bacon weighing from 6 to 8 pounds requires about 20 days, and each additional two pounds increases the time by about four days.

I claim:

1. Curing meat by first pickling it in brine to impregnate it with salt throughout a portion only of its thickness, transferring the meat thus pickled into a curing box, subjecting the contents of said box to pressure, providing a liquid seal of brine over the meat, and continuing the curing action of the salt throughout the remainder of the thickness of the meat.

2. Curing meat by first pickling pieces thereof in brine to impregnate each piece with salt throughout a portion only of its thickness, piling the pieces thus pickled into a curing box, subjecting the contents of said box to compacting pressure, removing the pressure, and continuing the curing action of the salt throughout the remainder of the thickness of the meat pieces in said pile.

3. Curing meat by first pickling pieces thereof in brine to impregnate each piece with salt throughout a portion only of its thickness, piling the pieces thus pickled into a curing box, subjecting the contents of said box to compacting pressure, removing the pressure and forming a liquid seal of brine from the meat over the pile thereof, and continuing the curing action of the salt throughout the remainder of the thickness of the meat-pieces in said pile.

4. Curing bacon, corned beef and like meat by first pickling pieces thereof in brine to impregnate each piece with salt throughout a portion only of its thickness, piling the pieces thus pickled in layers in a rectangular curing-box, subjecting the contents of said box to compacting pressure to conform the pile to the box-walls and prevent waste, removing the pressure, and continuing the curing action of the salt throughout the remainder of the thickness of the pieces in said pile.

5. Curing bacon, corned beef and like meat by first pickling pieces thereof in brine to impregnate each piece with salt throughout a portion only of its thickness, piling the pieces thus pickled in layers in a rectangular curing-box, tamping down the layers to spread them, subjecting the pile to compacting pressure, removing the pressure and forming a liquid seal of brine from the meat over the pile thereof, and continuing the curing action of the salt throughout the remainder of the thickness of the pieces in said pile.

CHARLES B. TRESCOTT.